(12) United States Patent
Clark et al.

(10) Patent No.: US 8,676,787 B2
(45) Date of Patent: Mar. 18, 2014

(54) DISTRIBUTED MULTI-STEP ABSTRACT QUERIES

(75) Inventors: Adam T. Clark, Mantorville, MN (US); Frederick A. Kulack, Rochester, MN (US); John E. Petri, St. Charles, MN (US)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 13/334,458

(22) Filed: Dec. 22, 2011

(65) Prior Publication Data
US 2013/0166537 A1 Jun. 27, 2013

(51) Int. Cl.
*G06F 7/00* (2006.01)

(52) U.S. Cl.
USPC ............................ 707/722; 707/763; 707/769

(58) Field of Classification Search
USPC ........................................ 707/722, 763, 769
See application file for complete search history.

(56) References Cited

U.S. PATENT DOCUMENTS

| | | | |
|---|---|---|---|
| 6,424,358 B1 * | 7/2002 | DiDomizio et al. | 715/762 |
| 7,013,478 B1 | 3/2006 | Hendricks et al. | |
| 7,089,235 B2 * | 8/2006 | Dettinger et al. | 1/1 |
| 7,158,969 B2 | 1/2007 | Dettinger et al. | |
| 7,321,895 B2 * | 1/2008 | Dettinger et al. | 707/769 |
| 7,437,349 B2 | 10/2008 | Basu et al. | |
| 7,461,066 B2 | 12/2008 | Dettinger et al. | |
| 7,580,949 B2 | 8/2009 | Dettinger et al. | |
| 7,606,829 B2 | 10/2009 | Dettinger et al. | |
| 7,761,480 B2 * | 7/2010 | Toledano et al. | 707/804 |
| 7,949,652 B2 | 5/2011 | Dettinger et al. | |
| 2005/0187977 A1 * | 8/2005 | Frost | 707/104.1 |
| 2006/0112085 A1 | 5/2006 | Zijlstra et al. | |

* cited by examiner

*Primary Examiner* — Cheyne D Ly
(74) *Attorney, Agent, or Firm* — Patterson & Sheridan LLP

(57) ABSTRACT

Techniques for incorportating query results into an abstract database are described. Embodiments receive a first set of query results produced by executing a first abstract query using a first data abstraction model against a first database. One or more mappings between the first set of query results and one or more logical fields in a second data abstraction model are then determined, where the second data abstraction model models underlying physical data in a manner making a schema of the physical data transparent to a user of the second data abstraction model. Embodiments modify one or more logical field definitions to reference the first set of query results using the determined one or more mappings, such that abstract queries can be executed against both the second database and the first set of query results using the modified second data abstraction model.

18 Claims, 9 Drawing Sheets

DISTRIBUTED MULTI-STEP ABSTRACT QUERIES

BACKGROUND

The present invention generally relates to data processing and, more particularly, to processing multi-step abstract queries.

Databases are computerized information storage and retrieval systems. A relational database management system is a computer database management system (DBMS) that uses relational techniques for storing and retrieving data. An object-oriented programming database is a database that is congruent with the data defined in object classes and subclasses. Regardless of the particular architecture, a requesting entity (e.g., an application or the operating system) in a DBMS requests access to a specified database by issuing a database access request. Such requests may include, for instance, simple catalog lookup requests or transactions and combinations of transactions that operate to read, change and add specified records in the database. These requests (i.e., queries) are often made using high-level query languages such as the Structured Query Language (SQL). Upon receiving such a request, the DBMS may execute the request against a corresponding database, and return any result of the execution to the requesting entity.

Data abstraction techniques may be used in conjunction with a database in order to improve the usability of the database. Generally, such techniques provide for an abstraction layer between the database and the users of the database, which enables queries to be issued against the database without referring to the physical structure of the underlying database. This may, in turn, enable queries to be issued against a database using more user-friendly terms. However, creating such an abstraction model for a database is often a very time consuming and costly task, which may deter potential businesses from adopting such data abstraction techniques.

SUMMARY

Embodiments described herein provide a method, system and computer program product for incorporating query results into an abstract database. The method, system and computer program product include receiving a first set of query results, wherein the query results were produced by executing a first abstract query using a first data abstraction model against a first database. Additionally, the method, system and computer program product include determining one or more mappings between the first set of query results and one or more logical fields in a second data abstraction model, where the second data abstraction model models underlying physical data in a manner making a schema of the physical data transparent to a user of the second data abstraction model. The method, system and computer program product also include modifying one or more logical field definitions for the one or more logical fields to reference the first set of query results using the determined one or more mappings, such that abstract queries can be executed against both the second database and the first set of query results using the modified second data abstraction model.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
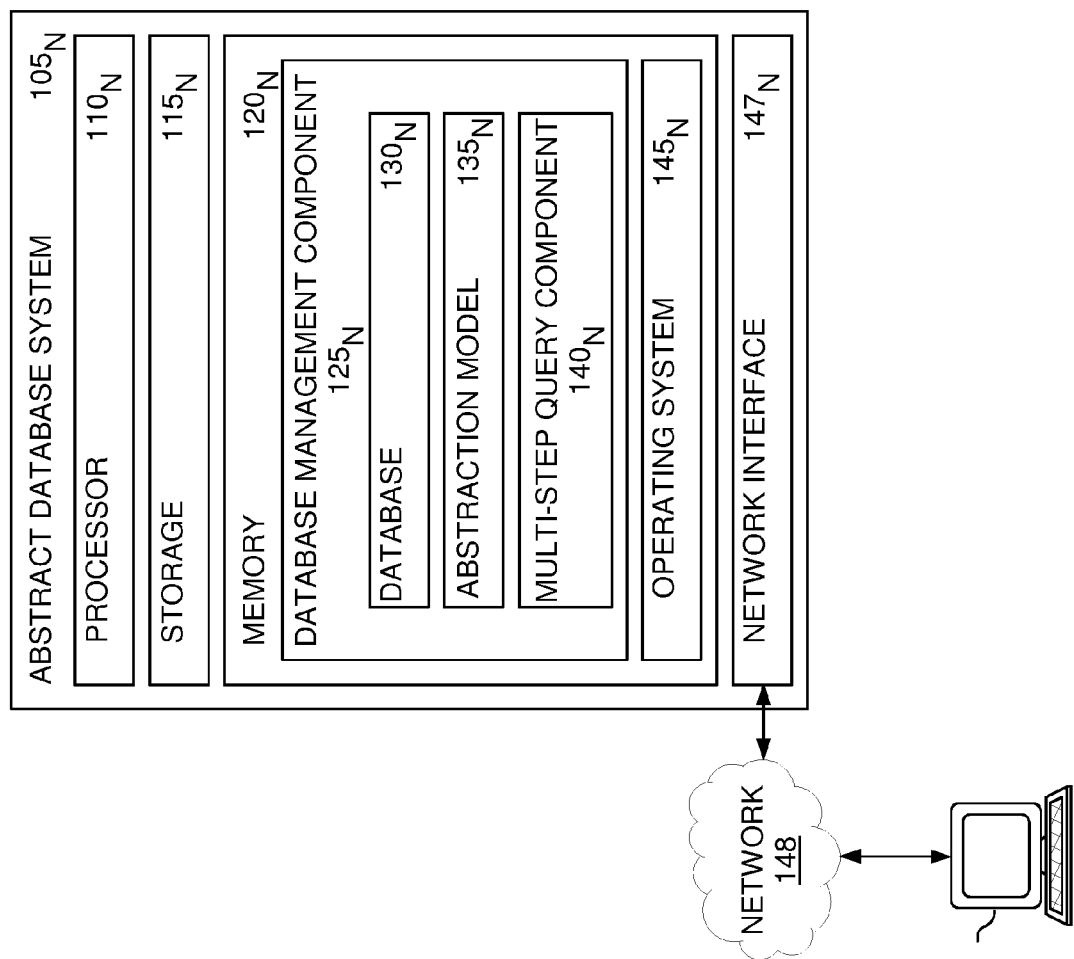
FIGS. 1A-1B are block diagrams illustrating computer systems utilized according to embodiments described herein.
Figure 1A:
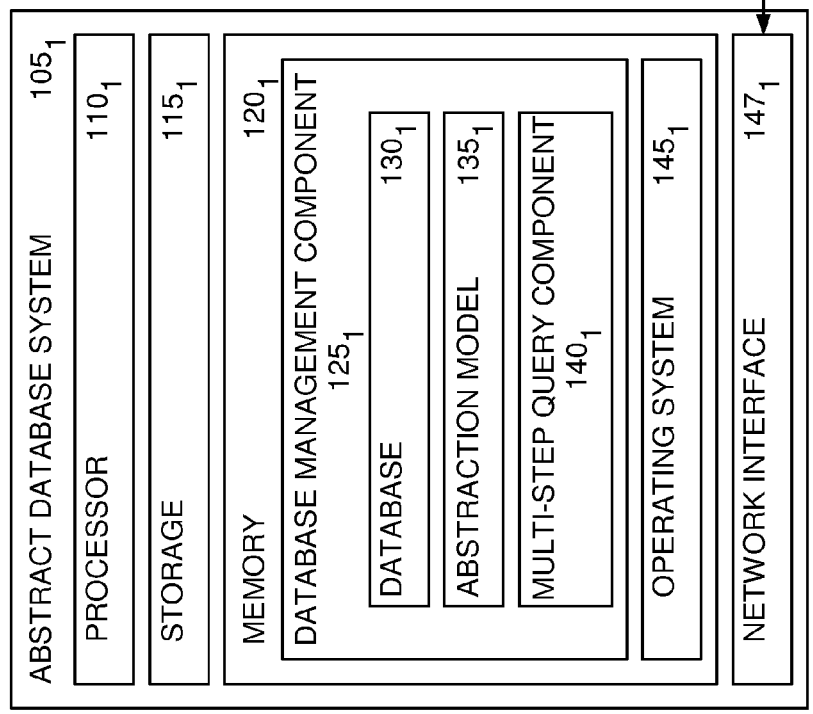

Data abstraction models serve to improve the usability of databases by, for instance, allowing users to enter queries using more user-friendly terminology. As an example, an underlying database may store a hospital patient's first name in table "contact" and column "f_name". However, it may be difficult for technologically unsophisticated users to construct queries against the database using the combination of this table and column. In contrast, a data abstraction model may be created with a logical field having a more user-friendly field name (e.g., "FirstName") that maps to the underlying data in the database (e.g., table "contact" and column "f_name"). Users may then specify the name of this logical field in abstract queries to reference the corresponding underlying data. Doing this enables less sophisticated users to more easily construct queries for the database.

Often times, there are similarities between the structure of multiple databases, even though the databases may be managed by separate entities and contain different data. For example, two hospitals may each maintain separate databases for storing their respective test result data. Although in this example the hospitals are separate and distinct from one another, and even though these databases may contain entirely different data, their databases may store the test result data using the same or a similar structure. For instance, both hospitals may adhere to the same industry standard data model for storing test results (e.g., ICD-9, DRG, LOINC, etc.). Accordingly, a data abstraction model created for one of the databases may be the same as or similar to a data abstraction model for the other database.

Additionally, in certain circumstances, users may wish to execute a multi-step abstract query across multiple databases. Generally, a multi-step query refers to a query made up of a plurality of sequential steps, where a first step includes a sub-query to be executed against a data store (e.g., a database) and where in each step after the initial step, a respective sub-query is executed against both a data set and the query results generated from executing the sub-query from the previous step. For example, a multi-step query could involve executing a first sub-query against a first database and then executing a second sub-query against both a second database and the query results produced from executing the first sub-query. However, if the first database uses a first abstraction model and the second database uses a second, different abstraction model, generating a multi-step query for these databases may be difficult, as the logical field names and mappings in the two abstraction models may differ and thus it may be unclear how the logical fields in the second abstraction model should map to the query results produced by executing the first sub-query against the first database and using the first abstraction model. Furthermore, since such a process is currently a manual process, it is often time consuming and inefficient.

As such, embodiments of the invention provide techniques for incorporating query results into an abstract database (i.e., a database configured to process abstract queries using an abstraction model). Embodiments receive a set of query results for inclusion in the abstract database. Embodiments may then analyze the query results against a second database and an abstraction model for the second database to determine similarities therebetween. For example, embodiments could compare the data in the query results against data in the second database and could determine one or more potential locations within the database for the query results. Embodiments then modify the abstraction model to incorporate the received query results into the abstract database based on the determined similarities. Advantageously, doing so enables the execution of multi-step queries across a plurality of abstract databases.

Referring now to FIG. 1A, FIG. 1A is a block diagram illustrating a computing environment configured with a multi-step query component, according to one embodiment presented herein. As shown, the computing environment 100 contains a plurality of abstract database systems $105_{1-N}$ and a client system 150, interconnected via a network 148. Generally, each abstract database system 105 is configured to host a respective abstract database 130 using a respective abstraction model 135. The abstract database systems $105_{1-N}$ may generally be any devices capable of hosting an abstract database 130. Additionally, although abstract database systems $105_1$ and $105_N$ are shown, such a depiction is without limitation and for illustrative purposes only. Moreover, one of ordinary skill in the art will quickly recognize that other computing environments may contain any number of abstract database systems.

As shown, each abstract database system $105_{1-N}$ includes, without limitation, a processor $110_{1-N}$, system storage $115_{1-N}$, a memory $120_{1-N}$, and a network interface card $147_{1-N}$. Each processor $110_{1-N}$ generally retrieves and executes programming instructions stored in the respective memory $120_{1-N}$. Similarly, each processor $110_{1-N}$ stores and retrieves application data residing in the respective memory $120_{1-N}$. An interconnect (not shown) may be used to transmit programming instructions and application data in each system $105_{1-N}$ between the processor $110_{1-N}$, storage $115_{1-N}$, network interface $147_{1-N}$, and memory $120_{1-N}$. Each processor $110_{1-N}$ is included to be representative of a single CPU, multiple CPUs, a single CPU having multiple processing cores, a GPU and the like. More generally, each processor $110_{1-N}$ may be any processor capable of performing the functions described herein. Although each memory $120_{1-N}$ is shown as a single entity, each memory $120_{1-N}$ may include one or more memory devices having blocks of memory associated with physical addresses, such as random access memory (RAM), read only memory (ROM), flash memory or other types of volatile and/or non-volatile memory. Each storage $115_{1-N}$, such as a hard disk drive, solid state device (SSD), or flash memory storage drive, may store non-volatile data. For instance, storage $115_1$ could contain analysis data that represents any data relating to database structure analysis. For instance, the analysis data could contain data relating to the structure of a physical database or a data abstraction model, as well as standards information (e.g., particular codes defined according to an industry standard). The abstract database systems $105_{1-N}$ may connect to the network 148 (e.g., the Internet) using the network interface $147_{1-N}$. Furthermore, as will be understood by one of ordinary skill in the art, any computer system capable of performing the functions described herein may be used.

In the pictured embodiment, each memory $120_{1-N}$ contains a respective database management system $125_{1-N}$ and an operating system $145_{1-N}$. In turn, each database management system $125_{1-N}$ (also referred to herein as a "DBMS") contains a respective database $130_{1-N}$, abstraction model $135_{1-N}$, and multi-step query component $140_{1-N}$. Generally, the database management systems $125_{1-N}$ manage the processing of queries issued against the respective database $130_{1-N}$ using the respective abstraction model $135_{1-N}$. The operating system $140_1$ may be any operating system capable of performing the functions described herein. Furthermore, although various elements are shown as residing in memory $120_1$ on the systems $105_{1-N}$, such a depiction is without limitation. Of course, one of ordinary skill in the art will recognize that elements such as, for instance, the database $130_1$, may reside in memory $120_1$ (as shown), in storage $115_1$, a combination thereof, or even on another computer system entirely, and that the depiction shown in FIG. 1A is for illustrative purposes only.

Generally, each multi-step query component $140_{1-N}$ is configured to process at least one step of a multi-step query against the respective database $130_{1-N}$. For instance, if the multi-step query component $140_2$ is processing the first step of a multi-step query, the DBMS $125_N$ could execute a first sub-query against the database $130_N$ using the abstraction model $135_N$ to produce a first set of query results. The multi-step query component $140_2$ could then transfer these query results to the multi-step query component $140_1$, which could incorporate the query results into the database $130_1$ such that a second sub-query in a second step of the multi-step query can be executed against both the database $130_1$ and the query results from the first sub-query using the abstraction model $135_1$. In one embodiment, the multi-step query component $140_1$ could then transfer the query results produced from executing the second sub-query to a third multi-step query component (not shown), which could then incorporate these query results into a third database for use in processing a third step of the multi-step query. Advantageously, doing so enables the processing of multi-step queries across a plurality of abstract databases.

In one embodiment, the multi-step query component $140_1$ is configured to analyze both the database $130_1$ and the database $130_N$ in incorporating the query results. For example, the multi-step query component $140_1$ could analyze the database $130_1$ to determine a first set of structural characteristics for the database $130_1$. These characteristics may include information related to the structure of the database, such as the tables contained in the database and the structure of those tables. The characteristics may further include information on the data contained in the tables. For instance, the multi-step query component $140_1$ could analyze the database $130_1$ and determine that one column of data conforms to a particular industry standard. The multi-step query component $140_1$ could also examine relationships between the tables in the database. One example of such a relationship would be if a first table of the database $130_1$ contains references to a second table of the database $130_1$ (e.g., a foreign key).

The multi-step query component $140_1$ may further analyze the database $130_N$ residing on the abstract database system $105_N$ to identify a second set of structural characteristics. Similar to the analysis for the database $130_1$, this analysis may examine the structure of tables within the database, as well as data contained in the tables. The multi-step query component $140_1$ may then compare the first set of structural characteristics with the second set of structural characteristics to identify similarities between the database $130_1$ and the database $130_N$.

As discussed above, a data abstraction model $135_1$ may be provided for the database $130_1$. Embodiments that use a data abstraction model allow for database queries to be written in the form of abstract queries composed using one or more logical fields. Returning to the present example, the multi-step query component $140_1$ may modify the abstraction model $135_1$ to include the received query results, based on the identified similarities between the database $130_1$ and the database $130_N$, and the data abstraction model $135_N$ provided for the database $130_N$. For instance, the multi-step query component $140_1$ may determine that a first table and a second table from the database $130_1$ and the database $130_N$, respectively, are related, since the tables are structured in the exact same way (although the tables may contain different data). Upon determining these two tables are related and that the query results pertain to one of these related tables, the multi-step query component $140_1$ could modify portions of the data abstraction model $135_1$ for the database $130_1$, based on portions of the data abstraction model $135_N$ corresponding to the query results (i.e., as determined based on the similarities between the two tables).

As an example, assume that the first table and the second table both contain contact information for hospital patients, that the first table in database $130_1$ contains a column named "fname" storing the first name of each patient, and that the second table in database $130_N$ contains a column named "f_name" for storing the first name of each patient. Furthermore, assume that the data abstraction model $135_1$ contains a logical field named "FirstName" which maps to the "fname" column in the table of database $130_1$. Upon determining that the first table and the second table are related, and upon further determining that the received query results relate to the column named "f_name" in the database $130_N$, the multi-step query component $140_1$ could update the mapping for the logical field named "FirstName" in the abstraction model $135_1$ to map to the received query results in addition to the column named "fname" in the database $130_1$. Advantageously, doing so enables the processing of multi-step queries across the databases $130_{1-N}$.

An Exemplary Query Execution Runtime Environment

Figure 1B:
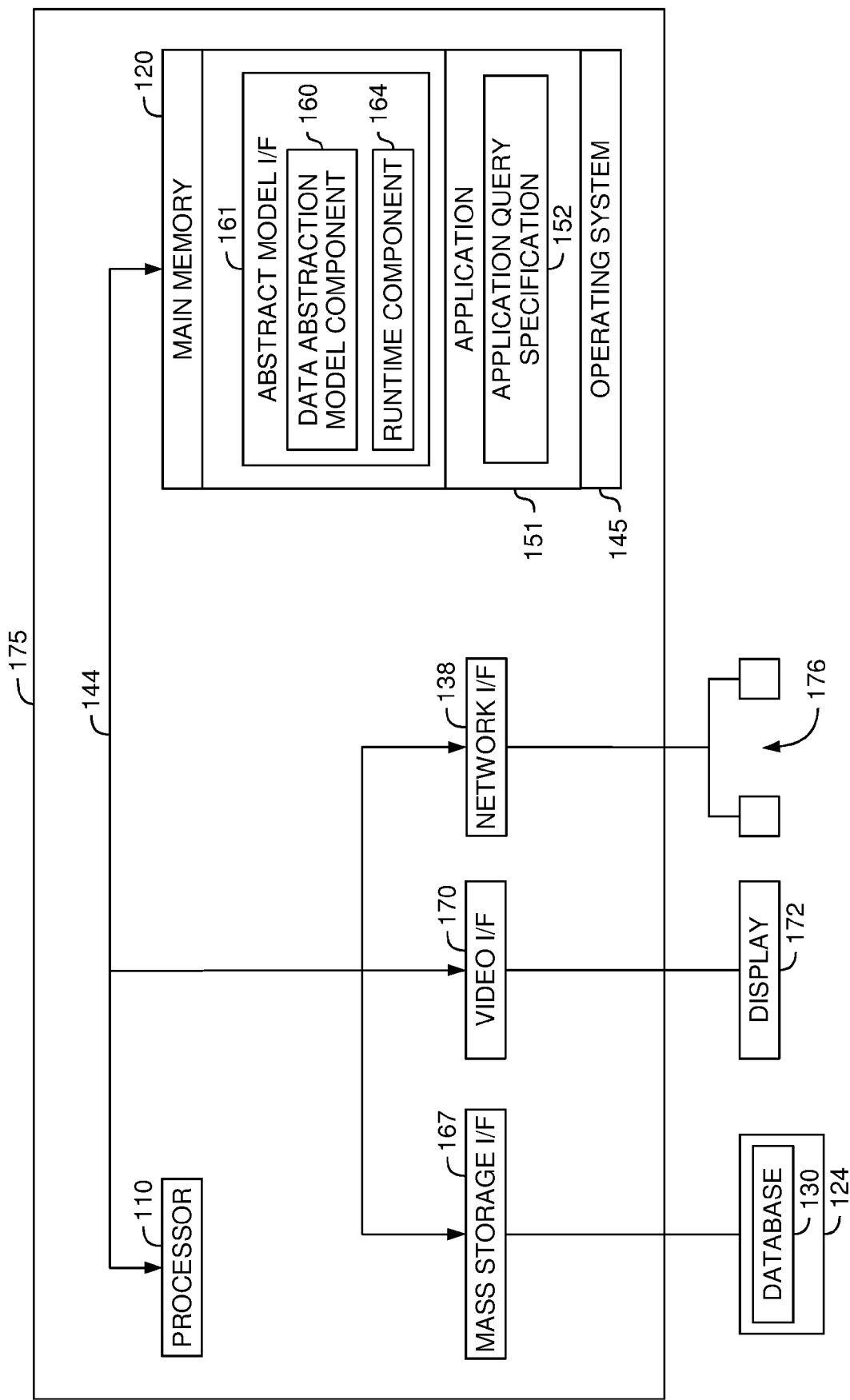

Referring now to FIG. 1B, a computing environment 100 is shown. In general, the environment includes computer system 175 and a plurality of networked devices 176. The computer system 175 may represent any type of computer, computer system or other programmable electronic device, including a client computer, a server computer, a portable computer, an embedded controller, a PC-based server, a mini-computer, a midrange computer, a mainframe computer, and other computers adapted to support the methods, apparatus, and article of manufacture of the invention. Furthermore, as discussed above, in one embodiment, the computer system 175 refers to a cloud node in a cloud computing environment.

In one embodiment, the computer system 175 is an eServer computer available from International Business Machines of Armonk, N.Y.

Illustratively, the computer system 175 comprises a networked system. However, the computer system 175 may also comprise a standalone device. In any case, it is understood that FIG. 1B is merely one configuration for a computer system. Embodiments of the invention can apply to any comparable configuration, regardless of whether the computer system 175 is a complicated multi-user apparatus, a single-user workstation, or a network appliance that does not have non-volatile storage of its own.

The embodiments of the present invention may also be practiced in distributed computing environments in which tasks are performed by remote processing devices that are linked through a communications network. In a distributed computing environment, program modules may be located in both local and remote memory storage devices. In this regard, the computer system 175 and/or one or more of the networked devices 176 may be thin clients which perform little or no processing.

As shown, the computer system 175 includes a number of operators and peripheral systems. For instance, the system 175 includes a mass storage interface 167 operably connected to a direct access storage device 124, a video interface 170 operably connected to a display 172, and a network interface 138 operably connected to the plurality of networked devices 176. The display 172 may be any video output device for outputting viewable information.

Computer system 175 is shown comprising at least one processor 110, which obtains instructions and data via a bus 144 from a main memory 125. The processor 110 could be any processor adapted to support the methods of the invention. The main memory 125 is any memory sufficiently large to hold the necessary programs and data structures. Main memory 125 could be one or a combination of memory devices, including Random Access Memory, nonvolatile or backup memory, (e.g., programmable or Flash memories, read-only memories, etc.). In addition, memory 125 may be considered to include memory physically located elsewhere in the computer system 175, for example, any storage capacity used as virtual memory or stored on a mass storage device (e.g., direct access storage device 124) or on another computer coupled to the computer system 175 via bus 144.

The memory 125 is shown configured with an operating system 140. The operating system 140 is the software used for managing the operation of the computer system 175. Examples of the operating system 140 include IBM OS/400®, UNIX, Microsoft Windows®, and the like.

The memory 125 further includes one or more applications 151 and an abstract model interface 161. The applications 151 and the abstract model interface 161 are software products comprising a plurality of instructions that are resident at various times in various memory and storage devices in the computer system 175. When read and executed by one or more processors 110 in the computer system 175, the applications 151 and the abstract model interface 161 cause the computer system 175 to perform the steps necessary to execute steps or elements embodying the various aspects of the invention. The applications 151 (and more generally, any requesting entity, including the operating system 140) are configured to issue queries against a database 130 (shown in storage 124). The database 130 is representative of any collection of data regardless of the particular physical representation of the data. A physical representation of data defines an organizational schema of the data. By way of illustration, the database 130 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

The queries issued by the applications 151 are defined according to an application query specification 152 included with each application 151. The queries issued by the applications 151 may be predefined (i.e., hard coded as part of the applications 151) or may be generated in response to input (e.g., user input). In either case, the queries (referred to herein as "abstract queries") are composed using logical fields defined by the abstract model interface 161. A logical field defines an abstract view of data whether as an individual data item or a data structure in the form of, for example, a database table. In particular, the logical fields used in the abstract queries are defined by a data abstraction model component 160 of the abstract model interface 161. The runtime component 164 transforms the abstract queries into concrete queries having a form consistent with the physical representation of the data contained in the database 130. The concrete queries can be executed by the runtime component 164 against the database 130.

Figure 2:
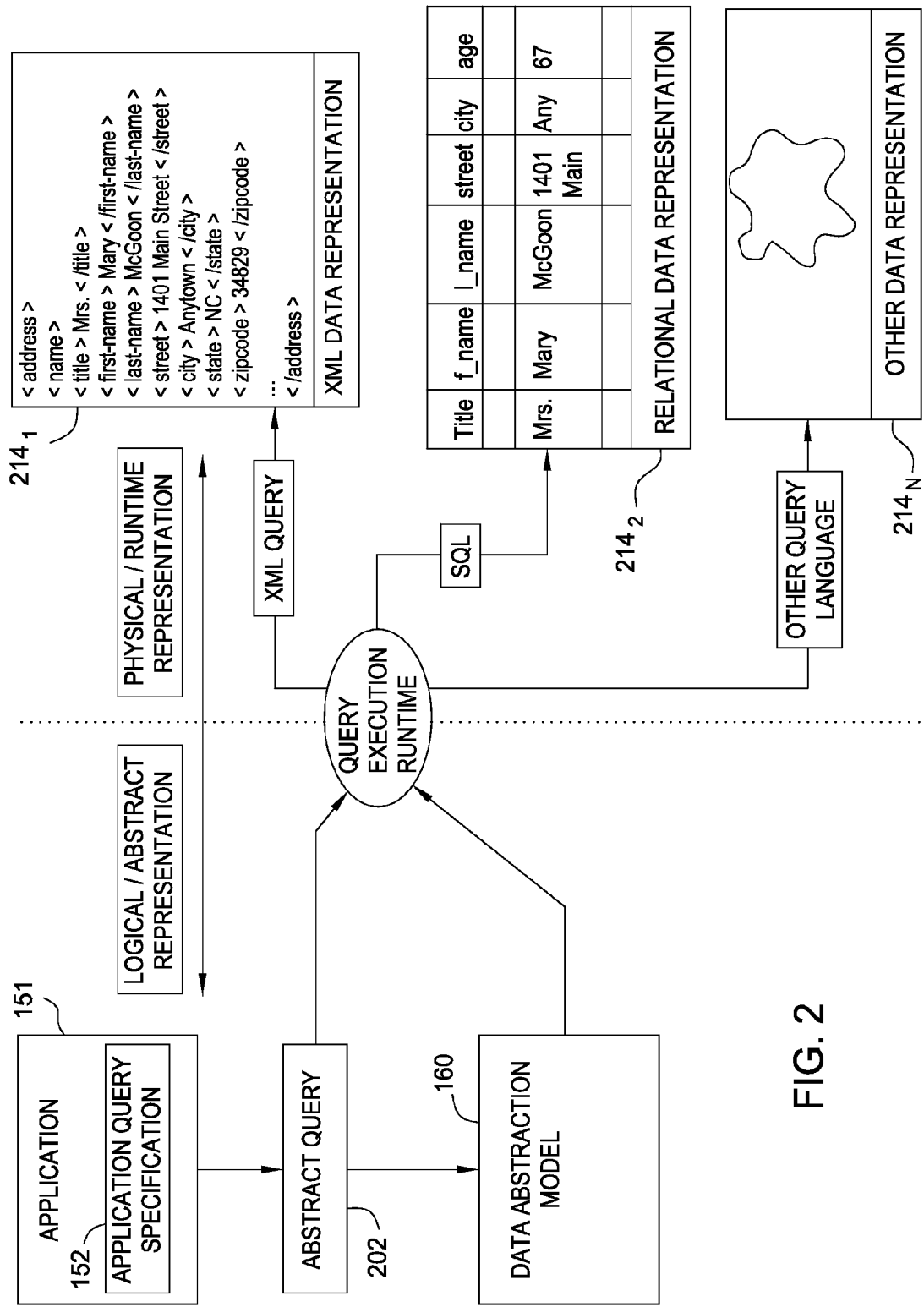
FIGS. 2-3 are relational views of software components for abstract query management, according to one embodiment described herein.

Referring now to FIG. 2, a relational view illustrating interaction of the runtime component 164, the application 150, and the data abstraction model 160 at query execution runtime is shown. The data abstraction model 160 is also referred to herein as a "logical representation" because the data abstraction model 160 defines logical fields corresponding to data structures in a database (e.g., database 130), thereby providing an abstract (i.e., a logical) view of the data in the database. A data structure is a physical arrangement of the data, such as an arrangement in the form of a database table or a column of the database table. In a relational database environment having a multiplicity of database tables, a specific logical representation having specific logical fields can be provided for each database table. In this case, all specific logical representations together constitute the data abstraction model 160. Physical entities of the data are arranged in the database 130 according to a physical representation of the data. A physical entity of data (interchangeably referred to as a physical data entity) is a data item in an underlying physical representation. Accordingly, a physical data entity is the data included in a database table or in a column of the database table, i.e., the data itself. By way of illustration, two physical representations are shown, an XML data representation $214_1$ and a relational data representation $214_2$. However, the physical representation $214_N$ indicates that any other physical representation, known or unknown, is contemplated. In one embodiment, a different single data abstraction model 160 is provided for each separate physical representation 214, as explained above for the case of a relational database environment. In an alternative embodiment, a single data abstraction model 160 contains field specifications (with associated access methods) for two or more physical representations 214. A field specification is a description of a logical field and generally comprises a mapping rule that maps the logical field to a data structure(s) of a particular physical representation.

Figure 3:
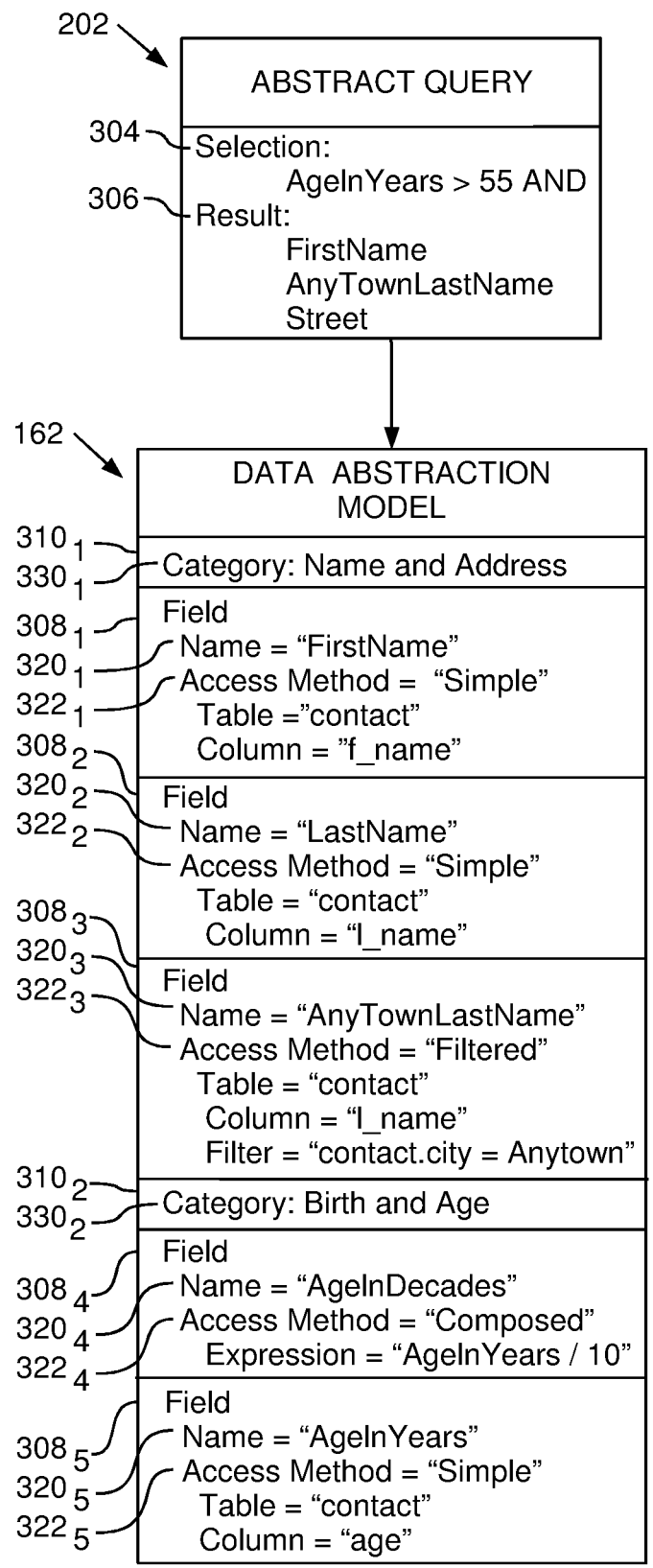

Using a logical representation of the data, the application query specification 152 specifies one or more logical fields to compose a resulting query. A requesting entity (e.g., the application 151) issues the resulting query 202 as defined by an application query specification of the requesting entity. In one embodiment, the abstract query 202 may include both criteria used for data selection and an explicit specification of result fields to be returned based on the data selection criteria. An example of the selection criteria and the result field specification of the abstract query 202 are shown in FIG. 3. Accordingly, the abstract query 202 illustratively includes selection criteria 304 and a result field specification 306.

The resulting query 202 is generally referred to herein as an "abstract query" because the query is composed according to abstract (i.e., logical) fields rather than by direct reference to the underlying data structures in the database 130. As a result, abstract queries may be defined that are independent of the particular underlying physical data representation used. For execution, the abstract query is transformed into a concrete query consistent with the underlying physical representation of the data using the data abstraction model 160. The concrete query is executable against the database 130. An exemplary method for transforming the abstract query into a concrete query is described below with reference to FIGS. 4-5.

In general, the data abstraction model 160 exposes information as a set of logical fields that may be used within an abstract query to specify criteria for data selection and specify the form of result data returned from a query operation. The logical fields are defined independently of the underlying physical representation being used in the database 130, thereby allowing abstract queries to be formed that are loosely coupled to the underlying physical representation.

An Exemplary Data Abstraction Model

Referring now to FIG. 3, a relational view illustrating interaction of the abstract query 202 and the data abstraction model 160 is shown. In one embodiment, the data abstraction model 160 comprises a plurality of field specifications $308_1$, $308_2$, $308_3$, $308_4$ and $308_5$ (five shown by way of example), collectively referred to as the field specifications 308. Specifically, a field specification is provided for each logical field available for composition of an abstract query. Each field specification may contain one or more attributes. Illustratively, the field specifications 308 include a logical field name attribute $320_1$, $320_2$, $320_3$, $320_4$, $320_5$ (collectively, field name 320) and an associated access method attribute $322_1$, $322_2$, $322_3$, $322_4$, $322_5$ (collectively, access methods 322). Each attribute may have a value. For example, logical field name attribute $320_1$ has the value "FirstName" and access method attribute $322_1$ has the value "Simple." Furthermore, each attribute may include one or more associated abstract properties. Each abstract property describes a characteristic of a data structure and has an associated value. As indicated above, a data structure refers to a part of the underlying physical representation that is defined by one or more physical entities of the data corresponding to the logical field. In particular, an abstract property may represent data location metadata abstractly describing a location of a physical data entity corresponding to the data structure, like a name of a database table or a name of a column in a database table. Illustratively, the access method attribute $322_1$ includes data location metadata "Table" and "Column." Furthermore, data location metadata "Table" has the value "contact" and data location metadata "Column" has the value "f_name." Accordingly, assuming an underlying relational database schema in the present example, the values of data location metadata "Table" and "Column" point to a table "contact" having a column "f_name."

In one embodiment, groups (i.e., two or more) of logical fields may be part of categories. Accordingly, the data abstraction model 160 includes a plurality of category specifications $310_1$ and $310_2$ (two shown by way of example), collectively referred to as the category specifications. In one embodiment, a category specification is provided for each logical grouping of two or more logical fields. For example, logical fields $308_{1-3}$ and $308_{4-5}$ are part of the category specifications $310_1$ and $310_2$, respectively. A category specification is also referred to herein simply as a "category". The categories are distinguished according to a category name, e.g., category names $330_1$ and $330_2$ (collectively, category name(s) 330). In the present illustration, the logical fields $308_{1-3}$ are part of the "Name and Address" category and logical fields $308_{4-5}$ are part of the "Birth and Age" category.

The access methods 322 generally associate the logical field names with data in the database (e.g., database 130 of FIG. 1B). Any number of access methods is contemplated depending upon the number of different types of logical fields to be supported. In one embodiment, access methods for simple fields, filtered fields and composed fields are provided. The field specifications $308_1$, $308_2$ and $308_5$ exemplify simple field access methods $322_1$, $322_2$, and $322_5$, respectively. Simple fields are mapped directly to a particular data structure in the underlying physical representation (e.g., a field mapped to a given database table and column). By way of illustration, as described above, the simple field access method $322_1$ maps the logical field name $320_1$ ("FirstName") to a column named "f_name" in a table named "contact." The field specification $308_3$ exemplifies a filtered field access method $322_3$. Filtered fields identify an associated data structure and provide filters used to define a particular subset of items within the physical representation. An example is provided in FIG. 3 in which the filtered field access method $322_3$ maps the logical field name $320_3$ ("AnyTownLastName") to data in a column named "l_name" in a table named "contact" and defines a filter for individuals in the city of "Anytown." Another example of a filtered field is a New York ZIP code field that maps to the physical representation of ZIP codes and restricts the data only to those ZIP codes defined for the state of New York. The field specification $308_4$ exemplifies a composed field access method $322_4$. Composed access methods compute a logical field from one or more data structures using an expression supplied as part of the access method definition. In this way, information which does not exist in the underlying physical data representation may be computed. In the example illustrated in FIG. 3 the composed field access method $322_4$ maps the logical field name $320_4$ "AgeInDecades" to "AgeInYears/10." Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 308 include a type attribute which reflects the format of the underlying data. However, in another embodiment, the data format of the field specifications 308 is different from the associated underlying physical data, in which case a conversion of the underlying physical data into the format of the logical field is required.

By way of example, the field specifications 308 of the data abstraction model 160 shown in FIG. 3 are representative of logical fields mapped to data represented in the relational data representation $214_2$ shown in FIG. 2. However, other instances of the data abstraction model 160 map logical fields to other physical representations, such as XML.

An illustrative abstract query corresponding to the abstract query 202 shown in FIG. 3 is shown in Table I below. By way of illustration, the illustrative abstract query is defined using XML. However, any other language may be used to advantage.

TABLE I

ABSTRACT QUERY EXAMPLE

```
001   <?xml version="1.0"?>
002   <!--Query string representation: (AgeInYears > "55"-->
003   <QueryAbstraction>
004     <Selection>
005       <Condition internalID="4">
006         <Condition field="AgeInYears" operator="GT" value="55"
007           internalID="1"/>
008     </Selection>
009     <Results>
010       <Field name="FirstName"/>
011       <Field name="AnyTownLastName"/>
012     </Results>
013   </QueryAbstraction>
```

Illustratively, the abstract query shown in Table I includes a selection specification (lines 004-008) containing selection criteria and a result specification (lines 009-012). In one embodiment, a selection criterion consists of a field name (for a logical field), a comparison operator (=, >, <, etc.) and a value expression (what the field is being compared to). In one embodiment, result specification is a list of abstract fields that are to be returned as a result of query execution. A result specification in the abstract query may consist of a field name and sort criteria.

An illustrative data abstraction model ("DAM") corresponding to the data abstraction model 160 shown in FIG. 3 is shown in Table II below. By way of illustration, the illustrative data abstraction model is defined using XML. However, any other language may be used to advantage.

TABLE II

DATA ABSTRACTION MODEL EXAMPLE

```
001   <?xml version="1.0"?>
002   <DataAbstraction>
003     <Category name="Name and Address">
004       <Field queryable="Yes" name="FirstName" displayable="Yes">
005         <AccessMethod>
006           <Simple columnName="f_name" tableName="contact"></Simple>
007         </AccessMethod>
008       </Field>
009       <Field queryable="Yes" name="LastName" displayable="Yes">
010         <AccessMethod>
011           <Simple columnName="l_name" tableName="contact"></Simple>
012         </AccessMethod>
013       </Field>
014       <Field queryable="Yes" name="AnyTownLastName" displayable="Yes">
015         <AccessMethod>
016           <Filter columnName="l_name" tableName="contact">
```

TABLE II-continued

DATA ABSTRACTION MODEL EXAMPLE

```
017              </Filter="contact.city=Anytown">
018            </AccessMethod>
019          </Field>
020        </Category>
021        <Category name="Birth and Age">
022          <Field queryable="Yes" name="AgeInDecades" displayable="Yes">
023            <AccessMethod>
024              <Composed columnName="age" tableName="contact">
025              </Composed Expression="columnName/10">
026            </AccessMethod>
027          </Field>
028          <Field queryable="Yes" name="AgeInYears" displayable="Yes">
029            <AccessMethod>
030              <Simple columnName="age" tableName="contact"></Simple>
031            </AccessMethod>
032          </Field>
033        </Category>
034    </DataAbstraction>
```

By way of example, note that lines 004-008 correspond to the first field specification $308_1$ of the DAM 160 shown in FIG. 3 and lines 009-013 correspond to the second field specification $308_2$.

Transforming an Abstract Query into a Concrete Query

Figure 4:
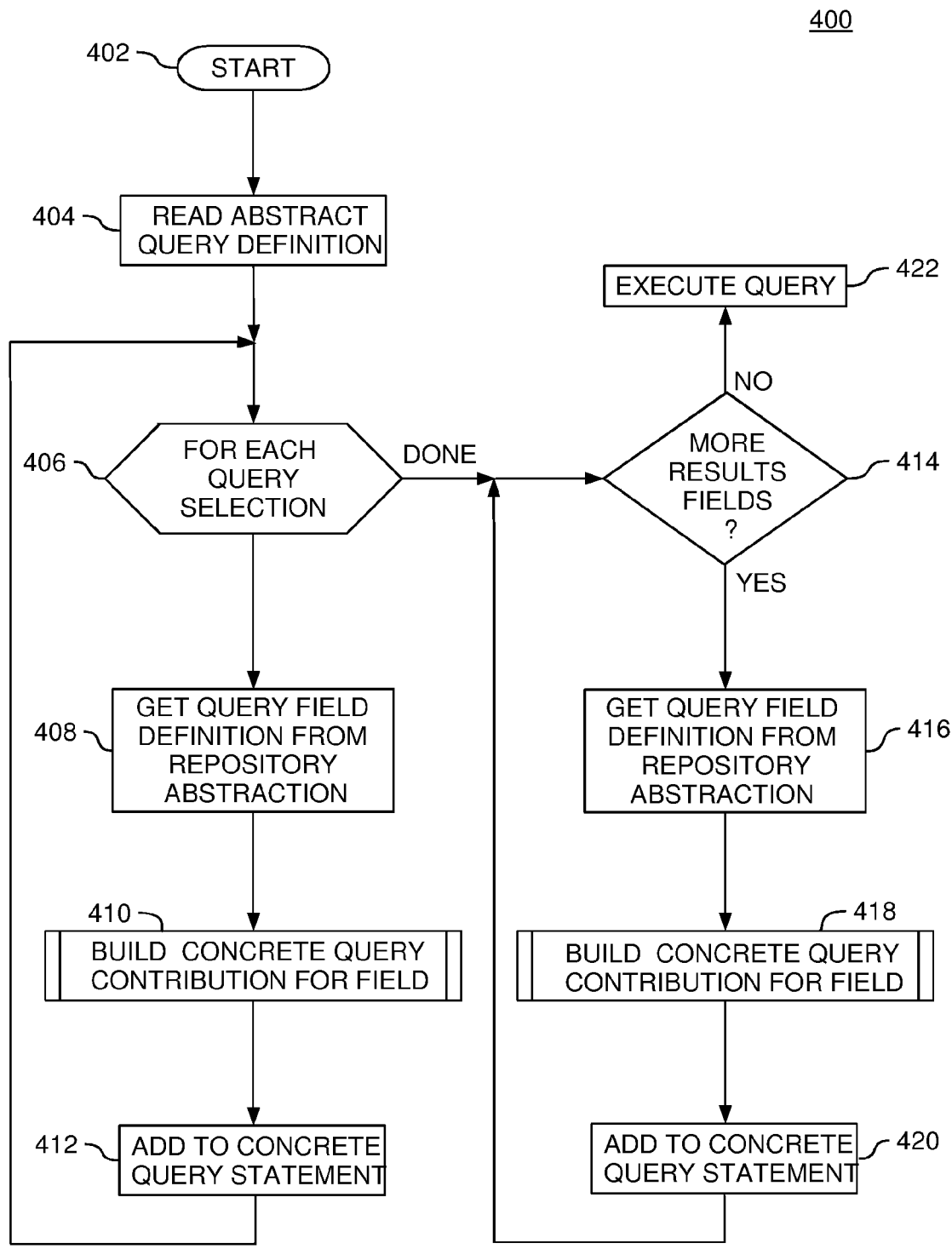
FIGS. 4-5 are flow diagrams illustrating the operation of a runtime component, according to one embodiment described herein.

Referring now to FIG. 4, an illustrative runtime method 400 exemplifying one embodiment of the operation of the runtime component 164 of FIG. 1B is shown. The method 400 is entered at step 402 when the runtime component 164 receives as input an abstract query (such as the abstract query shown in Table I). At step 404, the runtime component 164 reads and parses the abstract query and locates individual selection criteria and desired result fields. At step 406, the runtime component 164 enters a loop (comprising steps 406, 408, 410 and 412) for processing each query selection criteria statement present in the abstract query, thereby building a data selection portion of a concrete query. In one embodiment, a selection criterion consists of a field name (for a logical field), a comparison operator (=, >, <, etc.) and a value expression (what is field is being compared to). At step 408, the runtime component 164 uses the field name from a selection criterion of the abstract query to look up the definition of the field in the data abstraction model 160. As noted above, the field definition includes a definition of the access method used to access the data structure associated with the field. The runtime component 164 then builds (step 410) a concrete query contribution for the logical field being processed. As defined herein, a concrete query contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from the physical data repository, represented by the database 130 shown in FIG. 1B. The concrete query contribution generated for the current field is then added to a concrete query statement. The method 400 then returns to step 406 to begin processing for the next field of the abstract query. Accordingly, the process entered at step 406 is iterated for each data selection field in the abstract query, thereby contributing additional content to the eventual query to be performed.

After building the data selection portion of the concrete query, the runtime component 164 identifies the information to be returned as a result of query execution. As described above, in one embodiment, the abstract query defines a list of result fields, i.e., a list of logical fields that are to be returned as a result of query execution, referred to herein as a result specification. A result specification in the abstract query may consist of a field name and sort criteria. Accordingly, the method 400 enters a loop at step 414 (defined by steps 414, 416, 418 and 420) to add result field definitions to the concrete query being generated. At step 416, the runtime component 164 looks up a result field name (from the result specification of the abstract query) in the data abstraction model 160 and then retrieves a result field definition from the data abstraction model 160 to identify the physical location of data to be returned for the current logical result field. The runtime component 164 then builds (at step 418) a concrete query contribution (of the concrete query that identifies physical location of data to be returned) for the logical result field. At step 420, the concrete query contribution is then added to the concrete query statement. Once each of the result specifications in the abstract query has been processed, the concrete query is executed at step 422.

Figure 5:
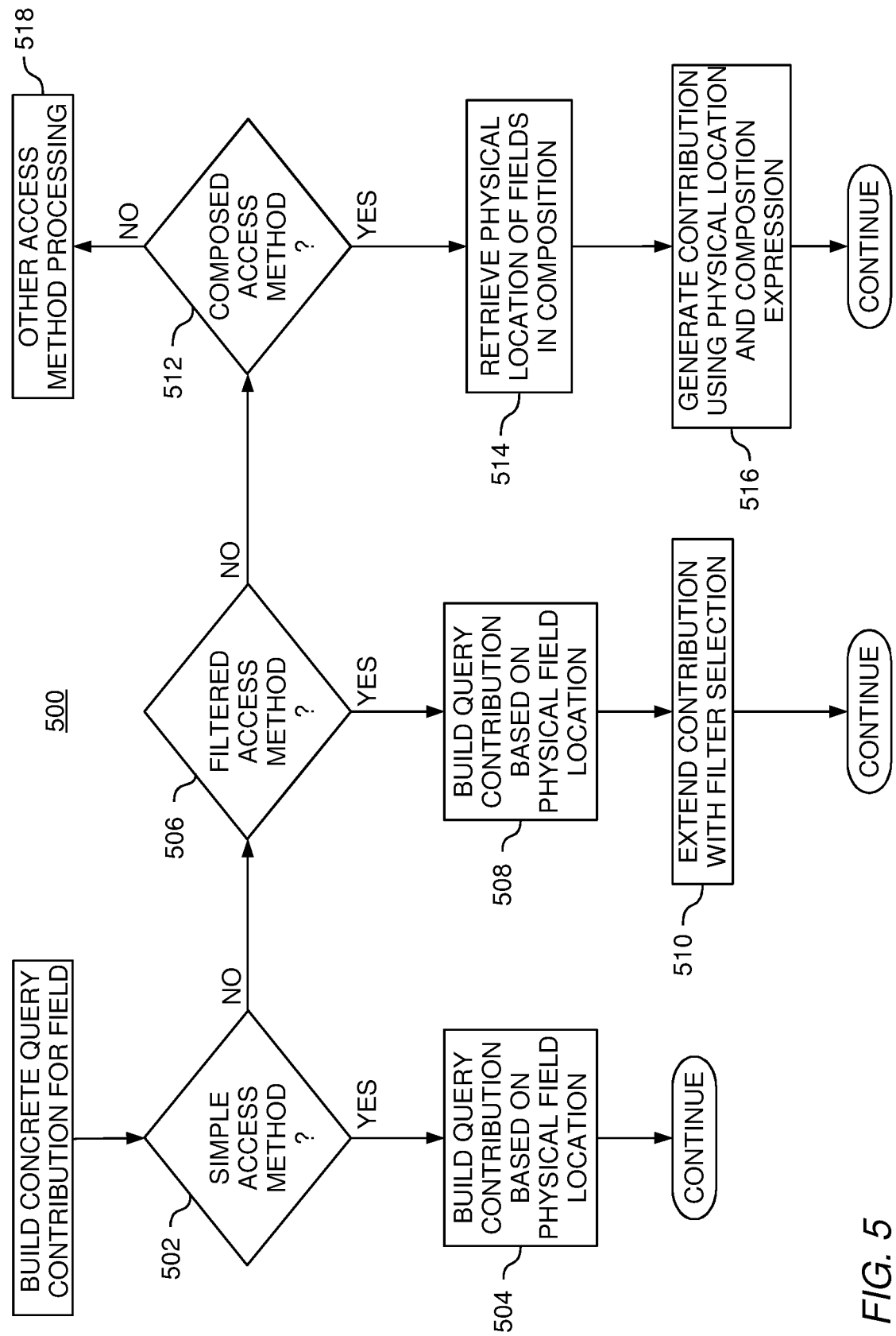

One embodiment of a method 500 for building a concrete query contribution for a logical field according to steps 410 and 418 is described with reference to FIG. 5. At step 502, the method 500 queries whether the access method associated with the current logical field is a simple access method. If so, the concrete query contribution is built (step 504) based on physical data location information and processing then continues according to method 400 described above. Otherwise, processing continues to step 506 to query whether the access method associated with the current logical field is a filtered access method. If so, the concrete query contribution is built (step 508) based on physical data location information for a given data structure(s). At step 510, the concrete query contribution is extended with additional logic (filter selection) used to subset data associated with the given data structure(s). Processing then continues according to method 400 described above.

If the access method is not a filtered access method, processing proceeds from step 506 to step 512 where the method 500 queries whether the access method is a composed access method. If the access method is a composed access method, the physical data location for each sub-field reference in the composed field expression is located and retrieved at step 514. At step 516, the physical field location information of the composed field expression is substituted for the logical field references of the composed field expression, whereby the concrete query contribution is generated. Processing then continues according to method 400 described above.

If the access method is not a composed access method, processing proceeds from step 512 to step 518. Step 518 is representative of any other access method types contemplated as embodiments of the present invention. However, it should be understood that embodiments are contemplated in which less than all the available access methods are implemented. For example, in a particular embodiment only simple access methods are used. In another embodiment, only simple access methods and filtered access methods are used.

Distributed Multi-Step Abstract Queries

Figure 6:
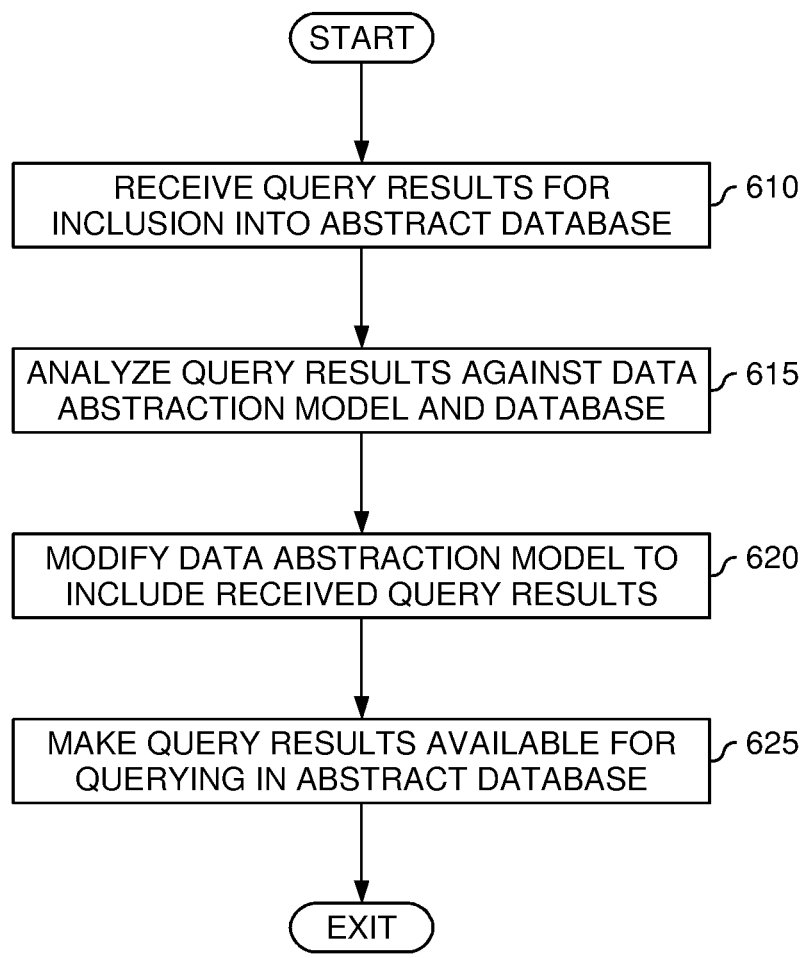
FIG. 6 is a flow diagram illustrating a method for incorporating query results into an abstraction model, according to one embodiment described herein.

FIG. 6 is a flow diagram illustrating a method for incorporating query results into an abstraction model, according to one embodiment described herein. As shown, the method 600 begins at step 610, where the multi-step query component 140 receives query results for inclusion in an abstract database. As discussed above, a multi-step query refers to a query containing a plurality of sequential sub-queries where the first sub-query is executed against a data store (e.g., a database) and each subsequent sub-query is executed against both a respective data store and the query results produced from the execution of the previous sub-query. For purposes of the present example, assume that the received query results are the results produced from executing a prior sub-query in a multi-step query.

The multi-step query component 140 then analyzes the query results against a database abstraction model and an underlying database to determine similarities therebetween (step 615). For instance, the multi-step query component 140 could determine which fields within the database to determine the data in the query results is similar to. As an example, the multi-step query component 140 could determine that the query results contain International Statistical Classification of Diseases and Related Health Problems medical classification codes (i.e., ICD-9 codes) and could determine that a particular column in the database also contains ICD-9 codes. If the multi-step query component 140 further determines that the abstraction model for the database further contains a logical field mapping to the particular column in the database containing ICD-9 codes, the multi-step query component 140 could determine that the logical field should also map to the ICD-9 data within the query results once the query results are incorporated into the abstract database.

In one embodiment, the multi-step query component 140 further analyzes a second data abstraction model that was used in executing the previous query that produced the received query results. The multi-step query component 140 could also analyze the database that the previous query was executed against. For instance, the multi-step query component 140 could compare the database against which the previous query was executed with the database into which the query results are being incorporated to identify structural similarities between the two databases. The multi-step query component 140 could then use this similarity information to determine which logical field(s) should map to the incorporated query results.

As an example, the multi-step query component could determine that a first database contains an "icd9" field containing ICD-9 code data and that a second database into which the query results are being incorporated contains an "icd-9 code" field also containing ICD-9 code data. Additionally, the multi-step query component 140 could determine that the received query results contain data from the "icd9" field in the first database. Upon determining that these fields contain structurally similar data, the multi-step query component 140 could determine one or more logical fields in the abstraction model for the second database that map to the "icd-9 code" field in the second database. The multi-step query component 140 could then use this determined information in incorporating the query results into the abstract database.

The multi-step query component 140 then modifies the data abstraction model to reference the received query results (step 620). The multi-step query component 140 also makes the query results available for querying in the abstract database (step 625) and the method 600 ends. Continuing the above example, upon determining the logical field(s) that map to the "icd-9 code" field in the database, the multi-step query component 140 could adjust the abstraction model such that these logical field(s) additionally map to the incorporated query results. For instance, the multi-step query component 140 could store the query results in a temporary table in the database and could adjust the abstraction model such that the determined logical field(s) map to the temporary table in which the query results are stored.

Figure 7:
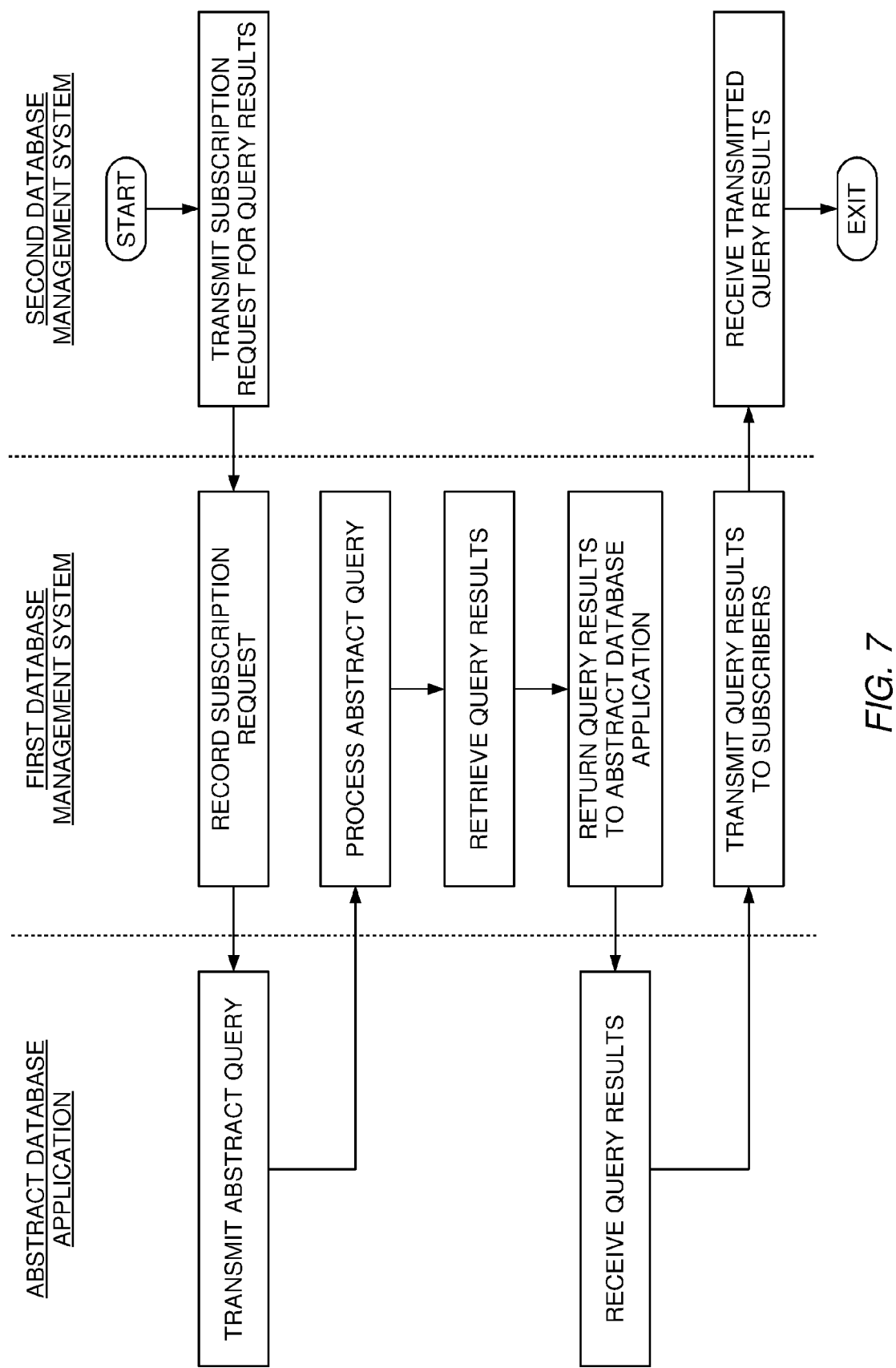
FIG. 7 is a flow diagram illustrating a method for transmitting query results for incorporation into an abstraction model, according to one embodiment described herein.

FIG. 7 is a flow diagram illustrating a method for transmitting query results for incorporation into an abstraction model, according to one embodiment described herein. For purposes of this example, the first and second DBMS are configured to use a publish/subscribe communication mechanism, where the first DBMS is configured to transmit query results produced from executing an abstract query against a first database to any subscribers. As shown, the method 700 begins at step 710, where a multi-step query component 140 at a second DBMS transmits a subscription request for query results to a first DBMS. Upon receiving the subscription request, a multi-step query component 140 at the first DBMS makes a record of the subscription request (step 715).

At some point, an abstract database application transmits an abstract query to the first DBMS for processing against a database managed by the first DBMS (step 720). For instance, the abstract query could be a multi-step query in which the first step of the multi-step query is to be executed against the abstract database managed by the first DBMS. Upon receiving the abstract query, the first DBMS executes the abstract query against the database (step 725). As discussed above, such processing may include generating a concrete query from the abstract query using a data abstraction model and then executing the concrete query against the underlying database. The first DBMS then retrieves the query results for the query (step 730). Once the query results are retrieved, the first DBMS returns the query results to the abstract database application from which the query was received (step 735) and the query results are received by the abstract database application (step 740).

The multi-step query component 140 on the first DBMS additionally transmits the query results to any subscribers from which a subscription request has been received (step 745). The multi-step query component 140 on the second DBMS then receives the query results (step 750) and the method 700 ends. In the present example, upon receiving the query results, the multi-step query component 140 on the second DBMS is configured incorporate the received query results into an abstract database managed by the second DBMS. The incorporated query results could then be used, for instance, in processing a subsequent step of a multi-step query.

Figure 8:
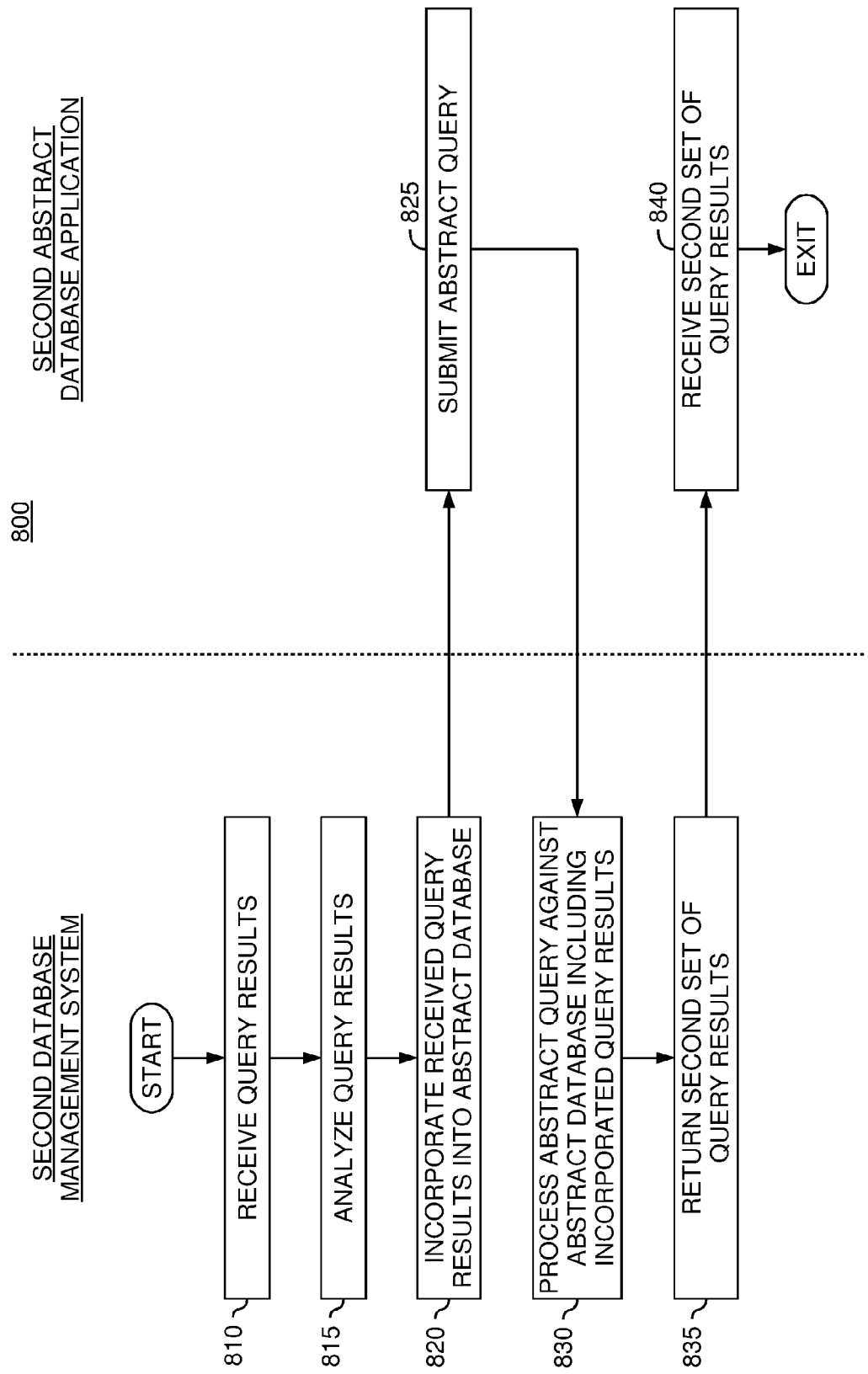
FIG. 8 is a flow diagram illustrating a method for incorporating query results into an abstraction model, according to one embodiment described herein.

An example of this is now discussed with relation to FIG. 8, which is a flow diagram illustrating a method for incorporating query results into an abstraction model, according to one embodiment described herein. As shown, the method 800 begins at step 810, where a multi-step query component 140 at a second DBMS receives a set of query results (e.g., from the multi-step query component 140 on the first DBMS discussed above in relation to FIG. 7). The multi-step query component 140 on the second DBMS then analyzes the received query results to determine similarities between the received query results and the abstract database managed by the second DBMS (step 815). For example, the multi-step query component 140 could determine one or more fields within the database the query results correspond to.

The multi-step query component 140 then incorporates the received query results into the abstract database managed by the second DBMS by updating the abstraction model associated with the abstract database (step 820). For example, the multi-step query component 140 could store the received query results into a table of the second database. The multi-step query component 140 could then update the abstraction model by modifying logical fields within the abstraction model to additionally map to at least a portion of the stored query results. That is, the multi-step query component 140 could determine fields within the database that particular portions of the query results correspond to and could then update the logical fields that refer to these fields to map to both the fields in the database and the respective portion of the query results. Of note, although in the current example the multi-step query component 140 stores the received query results in a table in the database, such an example is without limitation and for illustrative purposes only. More generally, the multi-step query component 140 may store the query results in any location accessible by the second DBMS (e.g., in an XML file on an accessible storage medium) and could update the data model for the second abstract database accordingly.

At some subsequent point in time, a second abstract database application transmits an abstract query for processing against the abstract database managed by the second DBMS (step 825). In one embodiment, the abstract query represents a subsequent step of a multi-step query which originally produced the query results (e.g., by executing a previous step of the multi-step query against the first database discussed in FIG. 7). Upon receiving the submitted query, the second DBMS processes the abstract query against the abstract database together with the incorporated query results to produce a second set of query results (step 830). The second DBMS then returns the second set of query results to the second abstract database application (step 835). The second abstract database application receives the returned set of query results (step 840) and the method 800 ends.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user could submit a multi-step database query (e.g., using a database client) to be executed across a plurality of databases or other data hosted in the cloud. For example, a DBMS configured with a multi-step query component 140 could execute on a computing system in the cloud and could execute the first sub-query of a multi-step query against a first database. The multi-step query component 140 could then transmit the query results from executing the first sub-query to a second multi-step query component 140, which could analyze the query results and incorporate them into a second database. The multi-step query component 140 could then execute the second step of the multi-step query against the second database and the incorporated query results. Doing so allows users to submit multi-step queries from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system, comprising:
   a processor; and
   a memory containing a program that, when executed by the processor, performs an operation for incorporating query results into an abstract database, comprising:
   receiving a first set of query results produced by executing a first abstract query using a first data abstraction model against a first database;
   determining one or more mappings between the first set of query results and one or more logical fields in a second data abstraction model, wherein the second data abstraction model models underlying physical data in a manner making a schema of the physical data transparent to a user of the second data abstraction model, further comprising:
   determining similarities between at least a portion of the first set of query results and at least one field in the second database; and
   determining at least one logical field that maps to the at least one field in the second database; and
   modifying one or more logical field definitions within the second data abstraction model to further map to the at least a portion of the first set of query results, based on the determined one or more mappings, wherein the one or more logical field definitions correspond to the one or more logical fields,
   such that abstract queries can be executed against both a second database and the first set of query results using the modified second data abstraction model,
   wherein the first database is distinct from the second database, and wherein the first data abstraction model is distinct from the second data abstraction model.

2. The system of claim 1, wherein the first abstract query comprises a sub-query from a first step of a multi-step query, and further comprising:
   executing a second abstract query comprising a second sub-query from a second step of the multi-step query against both the second database and the first set of query results to produce a second set of query results.

3. The system of claim 2, the operation further comprising:
transmitting the second set of query results to be incorporated into a third data abstraction model such that a third step of the multi-step query can be executed against a third database and the second set of query results.

4. The system of claim 1, the operation further comprising:
identifying one or more portions of the first database to which the first set of query results correspond;
determining one or more portions of the second database that correspond to the identified one or more portions of the first database;
determining one or more logical fields in the second data abstraction model that map to the determined one or more portions of the second database; and
modifying the one or more logical field definitions for the determined one or more logical fields in the second data abstraction model to further map to the first set of query results.

5. The system of claim 1, the operation further comprising:
receiving an abstract query for processing;
executing the abstract query against the second database and the first set of query results using the modified second data abstraction model to produce a second set of query results; and
transmitting the second set of query results.

6. The system of claim 1, the operation further comprising:
transmitting a subscription request for query results from the first database, wherein the first set of query results were transmitted upon execution of a first abstract query against the first database and further responsive to the subscription request.

7. The system of claim 1, wherein each logical field definition in the second data abstraction model specifies a respective access method specifying manner of accessing one or more physical fields in the second database, the respective access method selected from two or more different types of access methods.

8. A computer program product for incorporating query results into an abstract database, comprising:
a computer-readable storage memory having computer readable program code embodied therewith, the computer readable program code comprising:
computer readable program code to receive a first set of query results produced by executing a first abstract query using a first data abstraction model against a first database;
computer readable program code to determine one or more mappings between the first set of query results and one or more logical fields in a second data abstraction model, wherein the second data abstraction model models underlying physical data in a manner making a schema of the physical data transparent to a user of the second data abstraction model, further comprising:
computer readable program code to determine similarities between at least a portion of the first set of query results and at least one field in the second database; and
computer readable program code to determine at least one logical field that maps to the at least one field in the second database; and
computer readable program code to modify one or more logical field definitions within the second data abstraction model to further map to the at least a portion of the first set of query results, based on the determined one or more mappings, wherein the one or more logical field definitions correspond to the one or more logical fields,
such that abstract queries can be executed against both a second database and the first set of query results using the modified second data abstraction model,
wherein the first database is distinct from the second database, and wherein the first data abstraction model is distinct from the second data abstraction model.

9. The computer program product of claim 8, wherein the first abstract query comprises a sub-query from a first step of a multi-step query, and further comprising:
computer readable program code to execute a second abstract query comprising a second sub-query from a second step of the multi-step query against both the second database and the first set of query results to produce a second set of query results.

10. The computer program product of claim 9, the computer readable program code further comprising:
computer readable program code to transmit the second set of query results to be incorporated into a third data abstraction model such that a third step of the multi-step query can be executed against a third database and the second set of query results.

11. The computer program product of claim 8, the computer readable program code further comprising:
computer readable program code to identify one or more portions of the first database to which the first set of query results correspond;
computer readable program code to determine one or more portions of the second database that correspond to the identified one or more portions of the first database;
computer readable program code to determine one or more logical fields in the second data abstraction model that map to the determined one or more portions of the second database; and
computer readable program code to modify the one or more logical field definitions for the determined one or more logical fields in the second data abstraction model to further map to the first set of query results.

12. The computer program product of claim 8, the computer readable program code further comprising:
computer readable program code to receive an abstract query for processing;
computer readable program code to execute the abstract query against the second database and the first set of query results using the modified second data abstraction model to produce a second set of query results; and
computer readable program code to transmit the second set of query results.

13. The computer program product of claim 8, the computer readable program code further comprising:
computer readable program code to transmit a subscription request for query results from the first database, wherein the first set of query results were transmitted upon execution of a first abstract query against the first database and further responsive to the subscription request.

14. The computer program product of claim 8, wherein each logical field definition in the second data abstraction model specifies a respective access method specifying manner of accessing one or more physical fields in the second database, the respective access method selected from two or more different types of access methods.

15. The system of claim 1, wherein the operation further comprises:
storing the first set of query results, such that the stored first set of query results are accessible by a second database management system corresponding to the second database and the second data abstraction model.

16. The system of claim 15, wherein storing the first set of query results further comprises:

stroing the first set of query results in a temporary table of the second database, wherein modifying the one or more logical field definitions for the one or more logical fields further comprises modifying a first logical field definition of the one or more logical field definitions to reference at least a portion of the temporary table.

17. The system of claim 15, wherein storing the first set of query results further comprises:

storing the received query results into a table of the second database, wherein modifying the one or more logical field definitions for the one or more logical fields further comprises modifying a first logical field definition of the one or more logical field definitions to reference at least a portion of the table.

18. The system of claim 15, wherein storing the first set of query results further comprises:

storing the query results in an Extensible Markup Language (XML) file on a storage medium accessible by the second database management system, wherein modifying the one or more logical field definitions for the one or more logical fields further comprises modifying a first logical field definition of the one or more logical field definitions to reference at least a portion of the XML file.

\* \* \* \* \*